July 16, 1935.  L. B. HARVEY  2,008,326
TENDERING MEAT
Filed Feb. 27, 1933    2 Sheets-Sheet 1
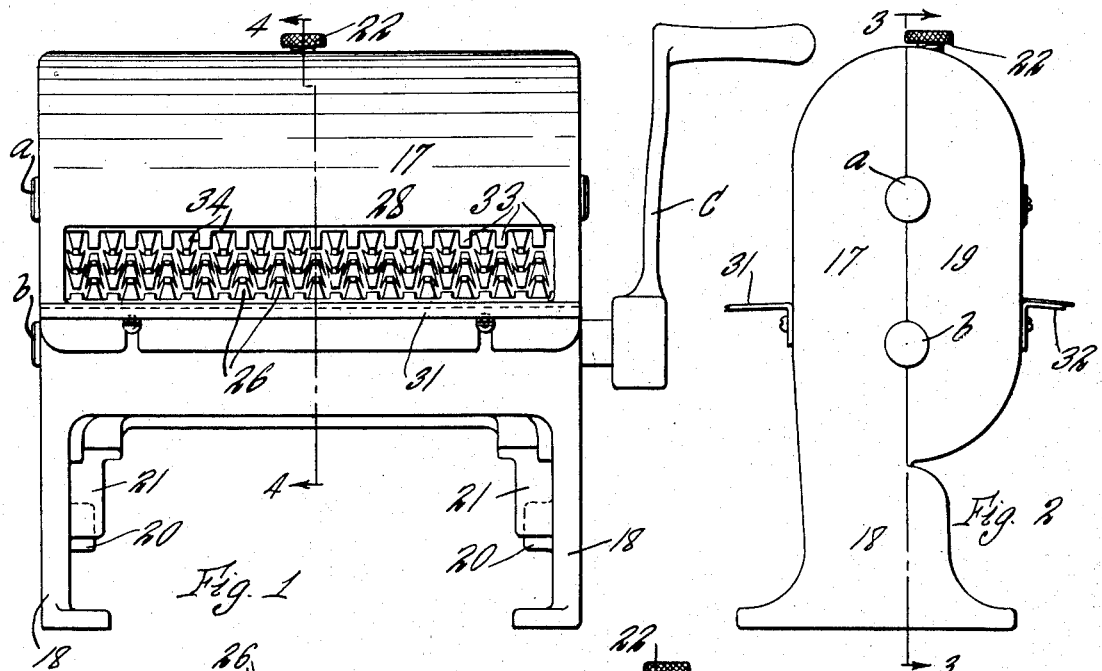
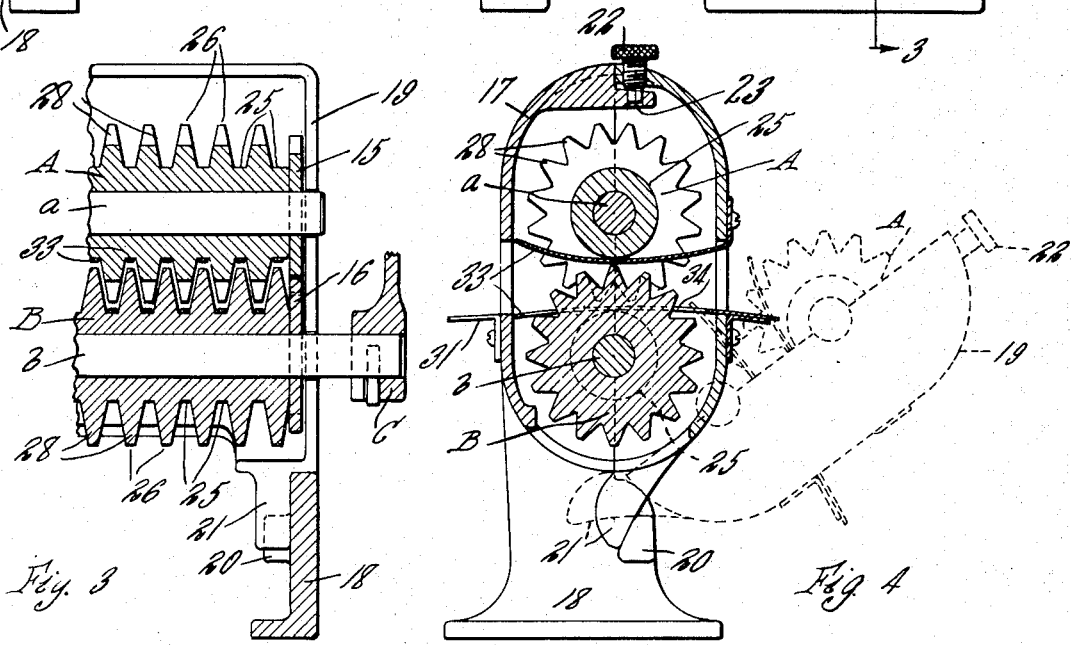
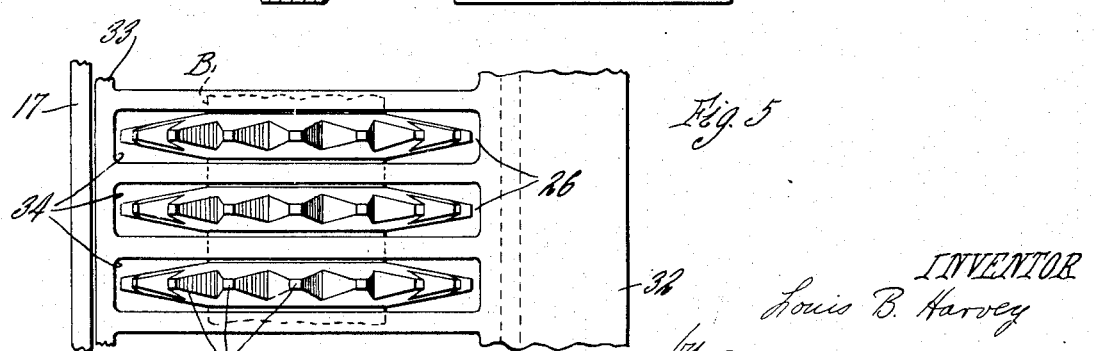
INVENTOR
Louis B. Harvey
by Parker, Prochnow & Karner
ATTORNEYS July 16, 1935. L. B. HARVEY 2,008,326
TENDERING MEAT
Filed Feb. 27, 1933   2 Sheets-Sheet 2
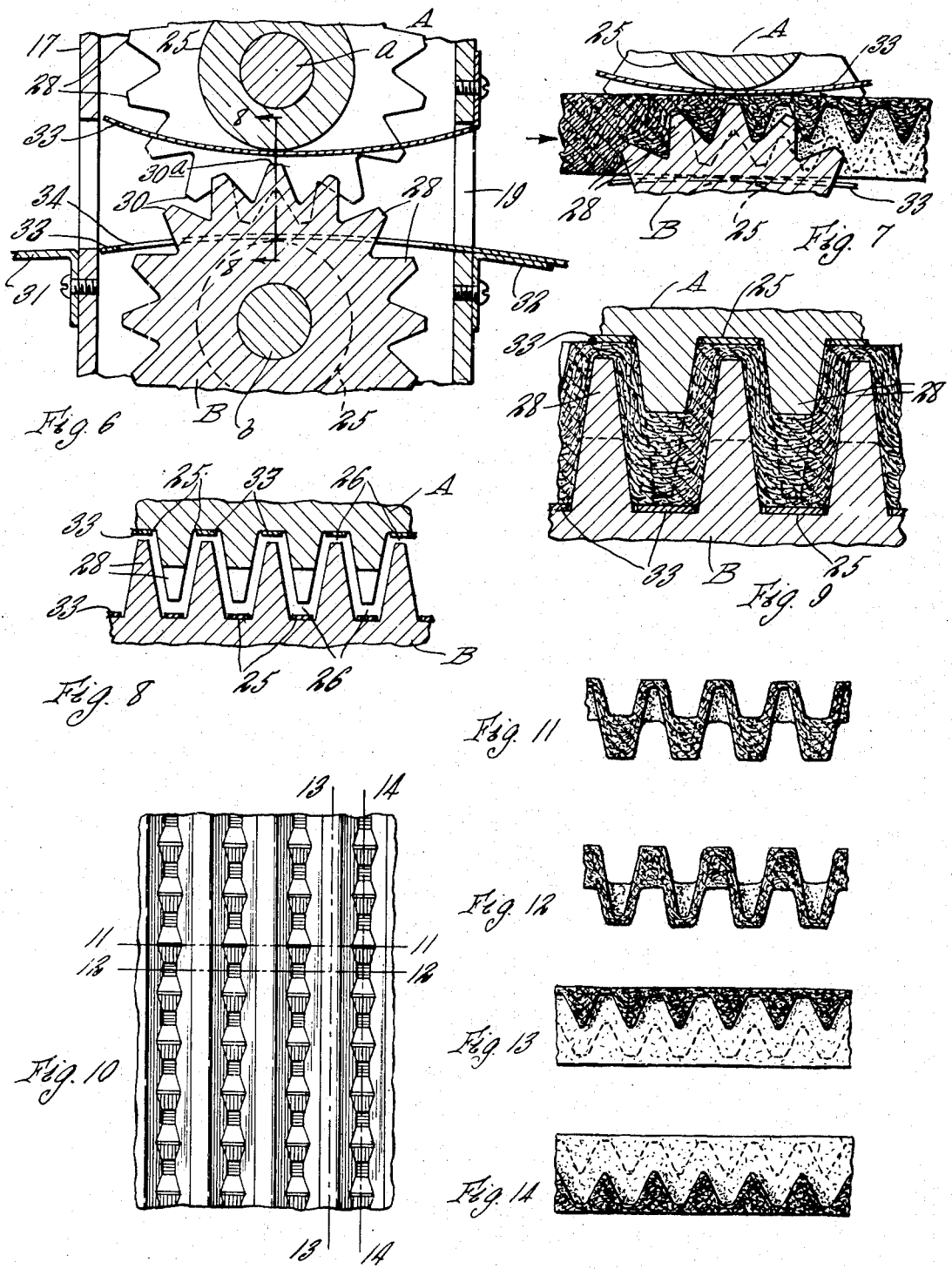

Patented July 16, 1935

2,008,326

UNITED STATES PATENT OFFICE 2,008,326

TENDERING MEAT

Louis B. Harvey, Buffalo, N. Y., assignor to Walter S. MacCumber, Buffalo, N. Y.

Application February 27, 1933, Serial No. 658,819

11 Claims. (Cl. 17—26)

This invention relates to improvements in tendering meats by stretching or tearing the fibers thereof.

In devices of this kind as heretofore made, the meat was either cut, punctured, or stretched in such a manner that certain parts of the meat were left practically unchanged. For example, in machines which cut the meat, the portions of the meat lying between the cuts remain as tough as before treatment, and in other machines, the meat is merely punctured in certain places by teeth or projections on the rolls, while other portions of the meat retain the original fiber structure, so that only small portions of the meat are made tender. In still other machines, certain portions only of the meat are subjected to pull or elongation or the meat is pulled or stretched in one direction and not in another direction, so that such meat, instead of being made uniformly tender, will be "stringy" or tough in one direction, or will have only portions thereof made tender while other portions will remain tough.

The objects of this invention are to produce a piece of meat, all parts of which will be subjected to pull in a plurality of directions so that the fibers of the meat will be torn or broken and loosened from adjacent fibers, to render all parts of the meat tender and easily chewed and digested; also to provide an improved process and machine or apparatus for tendering meat in this manner; also to provide a machine in which a piece of meat can be made tender in a single operation by subjecting all portions of the same to such stretching or elongation as to separate or tear the fibers of the meat; also to provide a meat tendering machine with cooperating teeth between which the meat is passed, and which are so constructed as to subject the fibers of the meat to elongating or tearing actions in all directions, without puncturing or cutting the meat, so that even a very tough piece of meat can be made uniformly tender throughout; also to provide a machine of this kind with teeth arranged to stretch or elongate the meat both lengthwise and crosswise of the direction of travel of the meat through the machine; also to impart to the meat under treatment a waffle-like or corrugated shape which greatly facilitates the cooking of the meat; also to improve the tendering of meat in other respects hereinafter specified.

In the accompanying drawings:

Fig. 1 is a front elevation and Fig. 2 a side elevation of a meat tendering machine embodying this invention.

Fig. 3 is a fragmentary rear elevation thereof, partly in section, on line 3—3, Fig. 2.

Fig. 4 is a transverse sectional elevation thereof on line 4—4, Fig. 1.

Fig. 5 is a fragmentary plan view, on an enlarged scale, of the lower roll of the machine, the upper roll being removed.

Fig. 6 is a fragmentary vertical sectional elevation showing the manner in which the rolls cooperate.

Fig. 7 is a similar fragmentary view of the cooperating teeth portions of the two rolls, and illustrating the action of the rolls on a piece of meat.

Fig. 8 is a fragmentary section thereof, on line 8—8, Fig. 6.

Fig. 9 is a similar section, on an enlarged scale, and showing the action of the teeth on a piece of meat.

Fig. 10 is a face view of a piece of meat or other material showing the pattern produced on the same by the rolls.

Figs. 11 and 12 are sections of the meat or other material, on lines 11—11 and 12—12 respectively, Fig. 10.

Figs. 13 and 14 are longitudinal sectional views, respectively on lines 13—13 and 14—14, Fig. 10.

In the accompanying drawings, my invention is illustrated as embodied in a machine having a pair of rolls between which the meat is passed, the rolls being provided with teeth or projections of novel construction and arrangement to produce a stretching and tearing effect upon the fibers of the meat. It will be understood, however, that it is not intended to limit this invention to use of the improved tooth construction on a pair of toothed rolls, since any number of toothed rolls may be provided, or if desired, the teeth may be mounted on flat surfaces or surfaces having curvatures other than cylindrical, or combinations of toothed flat or curved surfaces with rolls may be provided, if desired.

A and B represent respectively the upper and lower rolls of my improved meat tendering machine, the rolls being provided with shafts $a$ and $b$ which may be suitably journalled in a frame of any desired construction. The shaft $b$ is provided with an extension to which a crank C or other device for turning the shaft $b$ may be connected and the rolls or shafts are provided with gears 15 and 16 which mesh to cause the turning motion of the shaft $b$ to be transmitted to the shaft $a$ and the roll mounted thereon.

The frame in which the two rolls are mounted may, for example, be made in two parts, the part 17 being provided with a base 18 which may be secured to a table or other suitable support and a part 19 may be detachably secured to the part 17, preferably in such a manner that the bearings for the shafts are formed partially in each of the two frame members so that when the frame member 19 is removed from the frame member 17, the rolls and their shafts can also be readily removed from the machine for cleaning. In the particular construction shown, the stationary part 17 is provided near the base at opposite sides with lugs 20 and the removable part 19 is provided with cooperating lugs 21. When these lugs are in engagement as clearly shown in Fig. 4, the removable part 19 of the frame may be swung into an operative position in which the roll shafts will be confined in their bearings. The upper portion of the removable part may be secured to the stationary part in any suitable manner, for example, by means of a screw 22 which may be turned to enter into a hole or recess 23 of the stationary part 17. Any other means for removably arranging the rolls on the frame of the machine may, however, be employed if desired.

In order to enable the rolls to tear the fibers of the meat extending in various directions, the rolls are provided with a plurality of teeth which are so formed that when acting on the meat the teeth of one roll will enter into the spaces between the teeth of an adjacent roll and also so that the adjacent teeth of the two rolls at the bite of the rolls will be staggered. The bite of the rolls is where the meat is gripped between opposing teeth. Furthermore, in accordance with my invention, the teeth of one roll while acting on the meat pass the teeth of the adjacent roll, so that the points or apexes of the teeth of one roll pass beyond the bases of the teeth of the adjacent roll. This arrangement of the teeth results in a tearing of the fibers of the meat not only lengthwise of the direction of movement of the meat through the machine, but also transversely thereof and diagonally. A piece of meat in passing through the rolls is materially elongated and its surface is tremendously increased because of the grooves and indentations formed therein.

The desired results are accomplished in the rolls shown in the accompanying drawings by providing each roll with a series of annular grooves terminating at their inner ends at 25, the grooves having tapering side walls and thus forming between the grooves a series of ridges 26 which taper from their bases toward their peaks. The outer portions of these ridges are notched or recessed to form a series of teeth 28. The teeth 28 do not extend to the bases of the ridges and, in the particular construction shown, are approximately of only about one-half of the depth of the grooves 25. In other words, the rolls are provided with a series of annular ridges 26, the outer portions of which are notched or recessed to form the teeth 28.

When the two rolls are mounted in the frame of the machine, the ridges of one roll are arranged to enter into the spaces 25 between the ridges of the other roll, and the shafts of the rolls are spaced closely enough together so that the teeth formed on the outer portions of one ridge will extend into the corresponding groove of the other roll to such an extent that the points or apexes of the teeth will extend into the recesses 25 well beyond the notches of the ridges of the adjacent roll which form the teeth, that is, beyond the bases of the teeth. In other words, the apexes of the teeth of one roll will enter into the annular grooves 25 of the adjacent roll to such an extent that the apexes of the teeth pass beyond the bases of the teeth of the other roll. The two rolls are so connected by means of their gears 15 and 16 that the teeth of the two rolls will be in staggered relation, as is clearly illustrated in Figs. 4 and 6.

The result of this arrangement of the teeth is that the meat, which is preferably cut into a relatively thick slice or slab, in passing between the rolls of the machine will be stretched crosswise of the direction of its movement because of the corrugating effect on the meat produced by the alternate arrangement of the ridges of the two rolls, this stretching being sufficient to tear the fibers extending crosswise of the meat. This alternate arrangement of the ridges will also cause the meat to be stretched tightly across the outer edges of the ridges and teeth of the two rolls. This action of the rolls upon the meat is clearly illustrated in Fig. 9, which shows how the meat is drawn over adjacent ridges, so that the fibers of the meat extending crosswise of the direction of movement are stretched to several times their former length, resulting in a very effective breaking of fibers extending crosswise of the meat.

The fact that the peaks of the teeth of one roll extend toward the axis of the other roll beyond the bases of the teeth of the other roll has an important effect upon the action of the machine on the meat, since without this arrangement, certain portions of the meat lying in lines crosswise of the machines could pass through the machine without stretching. By means of the construction shown, however, any fibers lying across the bases of the teeth of one roll transversely to the direction of movement to the meat will be engaged by the peaks of the teeth of the other roll and stretched into a zigzag or corrugated form.

The teeth on the annular ridges serve not only to feed the meat into the space between the rolls, but also form indentations in the meat, which results in a material increase of the surface of the meat, and the stretching and tearing of the fibers extending lengthwise of the direction of movement of the meat.

Because of the staggered arrangement of the teeth, it will be evident that the portions of the meat entering the rolls and engaged by the peaks of adjacent teeth will be stretched by these teeth until the same pass through the plane of the roll shafts. This results in a stretching of fibers extending diagonally of the direction of movement of the meat through the machine. This action of the rolls can be seen by referring, for example, to Fig. 6, in which the peaks 30 of the two adjacent teeth at the entering side of the rolls will engage portions of a piece of meat in close proximity to each other. As the rolls are turned, these two teeth occupy the positions indicated by 30a, in which positions the peaks of these teeth are several times as far apart as in the positions 30, resulting in a diagonal tearing of the fibres of the meat between the teeth.

Considering the action of the rolls upon a piece of meat, as is illustrated in Figs. 10 to 14 inclusive, it will be noted that the rolls produce a corrugation of the meat in the direction of movement through the rolls. The meat will have grooves formed in opposite sides thereof lengthwise of the direction of its movement through the machine and the grooves on opposite sides will be in staggered relation to each other. The teeth engaging the opposite longitudinal edges of the piece of meat hold the same so that it cannot be pulled crosswise of the ridges of the rolls and, consequently, the meat between the longitudinal edges of the piece of meat is subjected to an elongation of several times its original length. This effect on the meat is shown in the cross sections in Figs. 11 and 12. The meat at the peaks and troughs of the corrugations is further deformed by the indentations made by the teeth into these portions of the meat, as shown in Figs. 10, 13 and 14, which produces an elongation of the meat in the direction of travel of the same and in the breaking of the lengthwise fibers. Furthermore, the meat is stretched diagonally in two directions, as has already been explained, so that a thorough breaking of fibers in at least four different directions results, which produces a thorough tendering of the meat.

The machine may be provided at opposite sides thereof with shelves 31 and 32 upon which the meat may rest before and after treatment, and the rolls are preferably also provided with strippers 33 to prevent the meat from adhering to the rolls. These strippers 33 are in the form of sheets of metal having slits or recesses 34 cut out of the same through which the teeth and ridges of the rolls extend, so that the portions of the strippers between the cut-out portions 34 lie at the inner portions of the grooves or recesses 25 in the rolls. Any other means for stripping meat from the rolls may be employed, if desired.

The advantages of the processing of the meat, as described, are, in the first place, that a piece of meat can be made thoroughly tender by a single passage through the machine, and it is quite immaterial how the meat is cut before passing it through the machine. In the case of extremely tough meat, a piece of meat can be passed through the machine two or more times, preferably by turning it so that the corrugations produced in the meat by the first passage will extend crosswise of the direction of travel of the meat through the machine the next time.

The meat, when processed as described does not retain the exact pattern produced by the rolls, as illustrated in Figs. 10 to 14, but approximates this pattern. Consequently, when such meat is cooked, the heat will penetrate very quickly through the meat, since the walls of the corrugations are thin, so that the same can be cooked in a fraction of the time necessary for a similar unprocessed cut of meat. The cooked meat, being very tender, is easily chewed and digested. The action of the teeth of the machine on the meat is such as to leave all of the juice in the meat.

I claim as my invention:

1. A process of tendering meat in slab form which includes stretching a meat slab from edge to edge while forming corrugating folds therein, and concomitantly stretching the opposite crest portions of the folds in directions approximately normal to the faces of the slab.

2. The process of tendering meat which includes subjecting a slab of meat to the action of teeth engaging the opposite faces of the slab, said teeth stretching the meat into corrugations and entering the folds of the corrugations to stretch the meat lengthwise of said corrugations, and concomitantly stretching the fibers of the meat diagonally of the length of said corrugations.

3. A meat tendering machine having a pair of members arranged to act on opposite faces of a piece of meat and provided with teeth extending outwardly from said members, each of the teeth of one member being movable into a space between adjacent teeth of the opposite member to provide an alternate arrangement of the teeth of the two rolls at the bite thereof, and the peaks of the teeth of one member being movable toward the other member beyond the bases of the adjacent teeth of said other member.

4. A meat tendering machine provided with cooperating members arranged to engage opposite faces of a piece of meat and provided with projections thereon arranged in staggered relation, each tooth of one member being movable past and beyond the base of adjacent teeth of the other member to provide an alternate arrangement of the teeth of the two rolls at the bite thereof, to simultaneously stretch meat acted upon by said members both lengthwise and crosswise of the meat.

5. A meat tendering machine including a pair of cooperating revolvable rolls having a plurality of spaced annular series of blunt teeth projecting outwardly therefrom, each tooth of one roll entering into the spaces between two annular series of teeth of the other roll to provide an alternate arrangement of the teeth of the two rolls at the bite thereof, and having its peak arranged to extend toward the axis of the other roll to a greater extent than the bases of the teeth of said other roll.

6. A meat tendering machine having a pair of members arranged to act on opposite faces of a piece of meat and provided with ridges spaced apart and extending outwardly from said members, a single row of blunt toothlike projections extending outwardly beyond each ridge, the projections and ridges of one member extending into the spaces between the projections and ridges of the other member and each peak of a projection of one member being movable into said spaces beyond the bases of adjacent teeth of the other member.

7. A meat tendering machine including a pair of cooperating rolls having a plurality of spaced annular ridges, the ridges of one roll being arranged to enter into the spaces between the ridges of the other roll, the outer portions only of said ridges being provided with outwardly projecting teeth, said rolls being so spaced relatively to each other that the teeth of one roll pass beyond the teeth of the other roll at the bite of the rolls, the teeth of the rolls being staggered at the bite of the rolls.

8. A meat tendering machine comprising a pair of opposing members arranged to receive and compress between them, a slab of meat to be tendered, each member having on its face towards the opposing member, a plurality of spaced rows of teeth, the rows being separated by grooves deeper than the teeth, the rows of teeth of one member being receivable in the grooves between the rows of the other member and extending into the grooves deeper than the teeth of that other member, the teeth of each row that are received in any groove being staggered with respect to the adjacent teeth separated by that groove, whereby the slab will be gripped between opposing members, given permanent undulating faces, and the fibres of the slab torn apart to some extent in a plurality of different, crosswise directions.

9. A meat tendering machine comprising a pair of opposing members arranged to receive and compress between them, a slab of meat to be tendered, each member having, on its face towards the opposing member, a plurality of spaced rows of teeth, the rows being separated by grooves deeper than the teeth, the rows of teeth of one member being receivable in the grooves between the rows of the other member and extending into the grooves deeper than the teeth of that other member, the teeth of each row that are received in any groove being approximately frusto-pyramidal, outwardly converging, and staggered with respect to the adjacent teeth separated by that groove, whereby the slab will be gripped between opposing members, given permanent undulating faces, and the fibres of the slab torn apart to some extent in a plurality of different, crosswise directions.

10. A meat tendering machine comprising a pair of opposing members arranged to receive and compress between them a slab of meat to be tendered, the meat gripping face of each member having a plurality of teeth that are receivable in internesting and staggered relation to the teeth of the other member, with the free ends of the teeth of each member passing deeper into the other member than the bases of the teeth of that member, whereby the slab compressed between opposing members will be given permanent approximate waffle-like, undulatory faces and its fibres will be torn apart to some extent in a plurality of different, crosswise directions.

11. A meat tendering machine comprising a pair of opposing members arranged to receive and compress between them a slab of meat to be tendered, the meat gripping face of each member having a plurality of blunt nosed, outwardly converging, tapering teeth that are receivable in internesting and staggered relation to the teeth of the other member, with the free ends of the teeth of each member passing deeper into the other member than the bases of the teeth of that member, whereby the slab compressed between opposing members will be given permanent approximate waffle-like, undulatory faces and its fibres will be torn apart to some extent in a plurality of different, crosswise directions.

LOUIS B. HARVEY.